United States Patent

Ludeman

[15] 3,643,983
[45] Feb. 22, 1972

[54] DEVICES FOR AXIAL ALIGNMENT OF PIPE OR OTHER FLANGES

[72] Inventor: Edwin H. Ludeman, Red Bank, N.J.
[73] Assignee: Andrews Industries, Dayton, N.J.
[22] Filed: Nov. 21, 1969
[21] Appl. No.: 878,765

[52] U.S. Cl. .............................................. 285/31, 285/363
[51] Int. Cl. ................................................... F16l 23/00
[58] Field of Search ................. 285/363, 368, 27, 24, 178, 285/405, 31

[56] References Cited

UNITED STATES PATENTS

| 235,384 | 12/1880 | Russell et al. | 285/363 |
| 2,740,423 | 4/1956 | Stillwagon | 285/363 X |
| 3,158,380 | 11/1964 | Carrell et al. | 285/363 X |
| 3,480,301 | 11/1969 | Kroening | 285/363 X |

FOREIGN PATENTS OR APPLICATIONS 923,015   4/1963   Great Britain ........................ 285/363

Primary Examiner—Thomas F. Callaghan
Attorney—Cifelli, Behr and Rhodes

[57] ABSTRACT

Devices are described which are adapted to be positioned between a pair of plain faced pipe or other flanges having a plurality of evenly spaced, oversize bolt holes to receive a like number of bolts to hold the flanges together. The devices are provided with a plurality of camming surfaces adapted to bear against the bolts and force them into a limiting position of their radial travel permitted by the clearance of the oversize bolt holes around the bolts, thus axially aligning the flanges.

3 Claims, 6 Drawing Figures

PATENTED FEB 22 1972 3,643,983

INVENTOR
EDWIN H. LUDEMAN
BY
Richards & Cifelli
ATTORNEYS

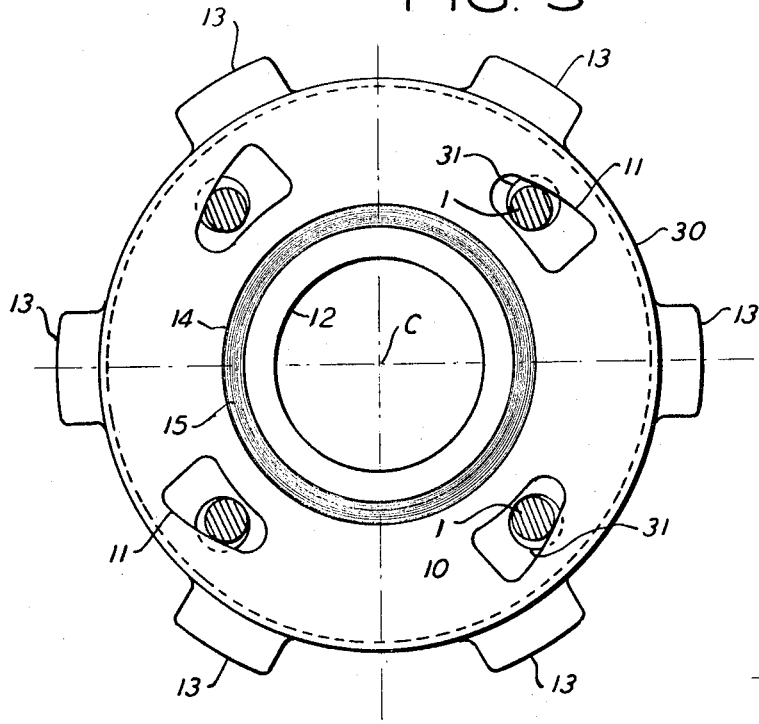
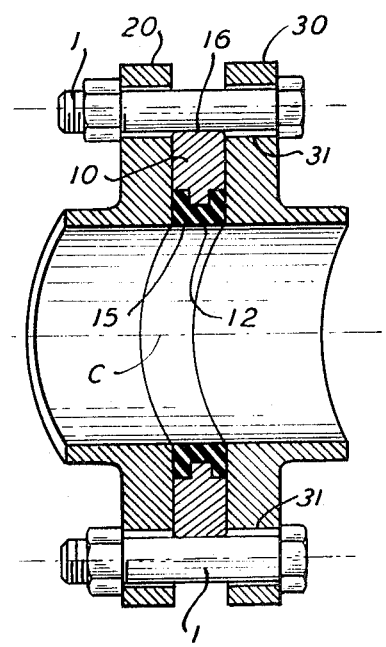
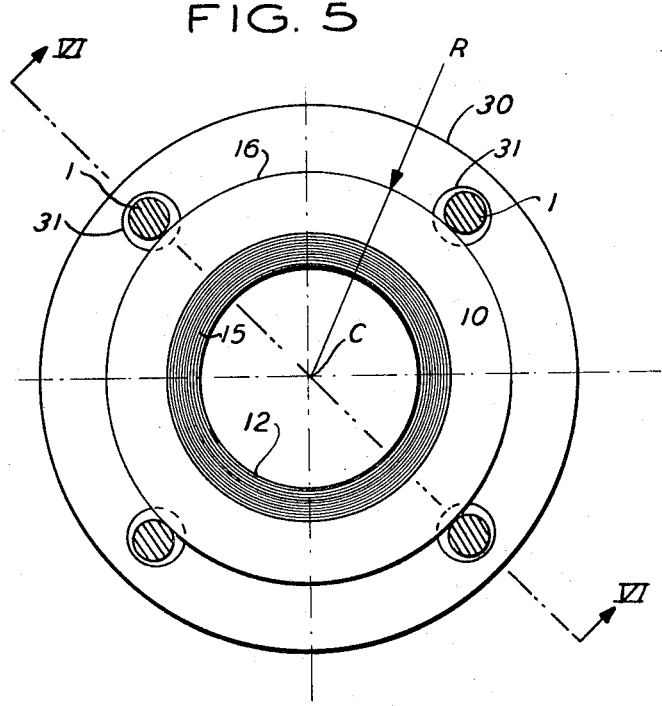

DEVICES FOR AXIAL ALIGNMENT OF PIPE OR OTHER FLANGES

BACKGROUND OF THE INVENTION

Certain standard types of flanges, for example, tongue-groove, provide positive means for accurate coalignment. Plain faced flanges have no such means and reliance is placed on inspection for initial alignment and friction for maintaining this alignment. The present invention relates to means for providing plain faced flanges with the accurate positive alignment obtained by a tongue-groove construction.

In a simple form the alignment means consists of a centrally bored flat plate which is inserted between the flanges. The plate has equally spaced cams or ramps on its periphery and suitable lugs for rotating the plate about the axis of its bore. Upon such rotation the cams first contact and then force each flange bolt radially outward until the clearances between each flange bolt and its flange holes are completely taken up. This automatically positions the flanges coaxially with the bore of the aligning means and with each other. Tightening the flange bolts completes the assembly operation. The flanges and aligning means are then positively secured in a coaxial position.

Thus, the advantages of a tongue-groove flange are substantially obtained with relatively inexpensive plain flanges. Principal disadvantages of tongue-groove construction include, besides a higher initial cost, the fact that substantial axial movement of the pipe is necessary for installation or removal, that male and female flanges are necessary, and the tendency for corrosion to bind the flanges together and thus make separation and removal difficult.

Sheet sealing gaskets may be placed between each flange and the alignment means if desired. In the preferred embodiment, however, a gasket, for example an elastomer, is inserted and bonded in a groove in each face of the aligning means, thus providing a unit construction in which the alignment means and sealing means are combined. By utilizing the groove in the alignment means to confine the gasket and prevent its extrusion by pressure an extra advantage is obtained by this combination. In addition assembly and disassembly of a pipe joint is greatly facilitated by the lack of multiple loose parts.

In another shown embodiment the alignment means is integral with the body of a flangeless valve. In this embodiment the valve is placed between two pipe flanges and long flange bolts which span the valve body, connect the two flanges. Use of the alignment means forces the two flanges and the valve into a coaxial position.

BRIEF DESCRIPTION OF THE DRAWINGS

In the accompanying drawings, wherein like reference designate like parts:

FIG. 3 shows a modified embodiment of the invention that includes integral gasket seals.

FIG. 5 is an elevational view of a camless modification of the invention with a mechanically locked but removable gasket.

FIG. 6 is a side sectional view along line VI—VI of FIG. 5.

DETAILED DESCRIPTION OF THE INVENTION

Figure 1:
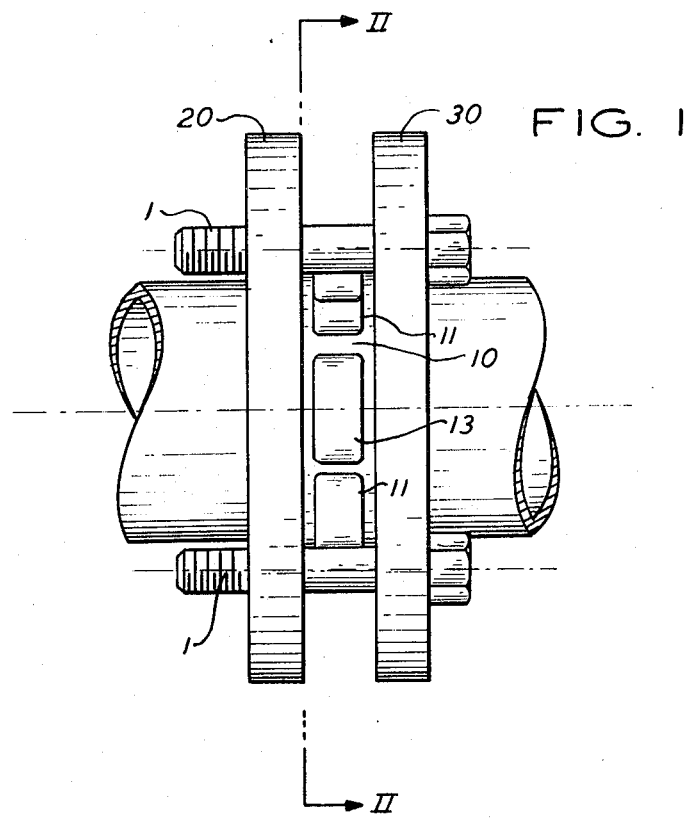
FIG. 1 is a side elevational view of the alignment means of the present invention installed in a piping system.
Figure 2:
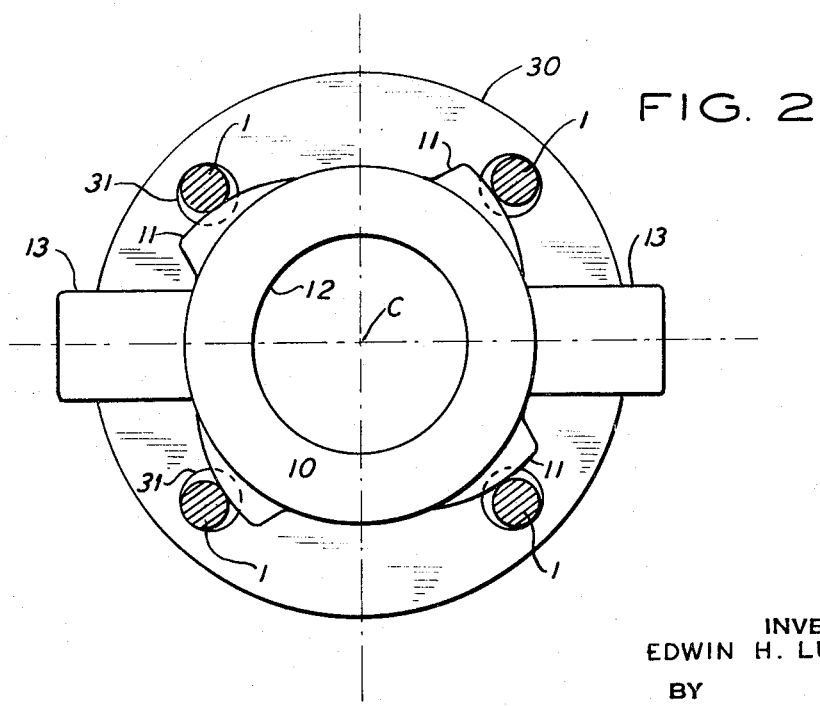
FIG. 2 is an elevational view of the alignment means taken on line II—II of FIG. 1.

Referring to the accompanying drawings, FIG. 1 is a side elevational view of the flanges 20 and 30 and the alignment means 10 in their final assembled position except that the flange bolts have not been tightened. FIG. 2 is a vertical view taken on line II—II of FIG. 1. As shown in this figure the flange bolts 1 are at the extreme radial position allowed by clearance hole 31 of the flange 30. They have been forced into this position by clockwise rotation about center C, of the alignment means 10, at which time the cams 11 of the alignment means force each bolt outward. Means 13, shown as lugs, are provided to facilitate this rotation. Upon tightening of the flange bolt nuts 2 the alignment means 10 is locked in its shown position. And, the alignment means in turn locks the bolts 1 in their shown position. Since all clearance is removed the axis C of the bore 12 of the alignment means 10 is brought into coincidence with the axis of the flange 30. In a similar manner the axis of flange 20 is brought into coincidence with the axis C. Thus the two flanges and the alignment means are brought into the desired coaxial position.

FIG. 3 shows a modified embodiment in which the flange bolts 1 are displaced inwardly rather than outwardly. A groove 14 is provided in each face of the alignment means and an elastomeric seal 15 is bonded in this groove. Thus, an integral unit which is both in alignment and sealing means is obtained.

Figure 4:
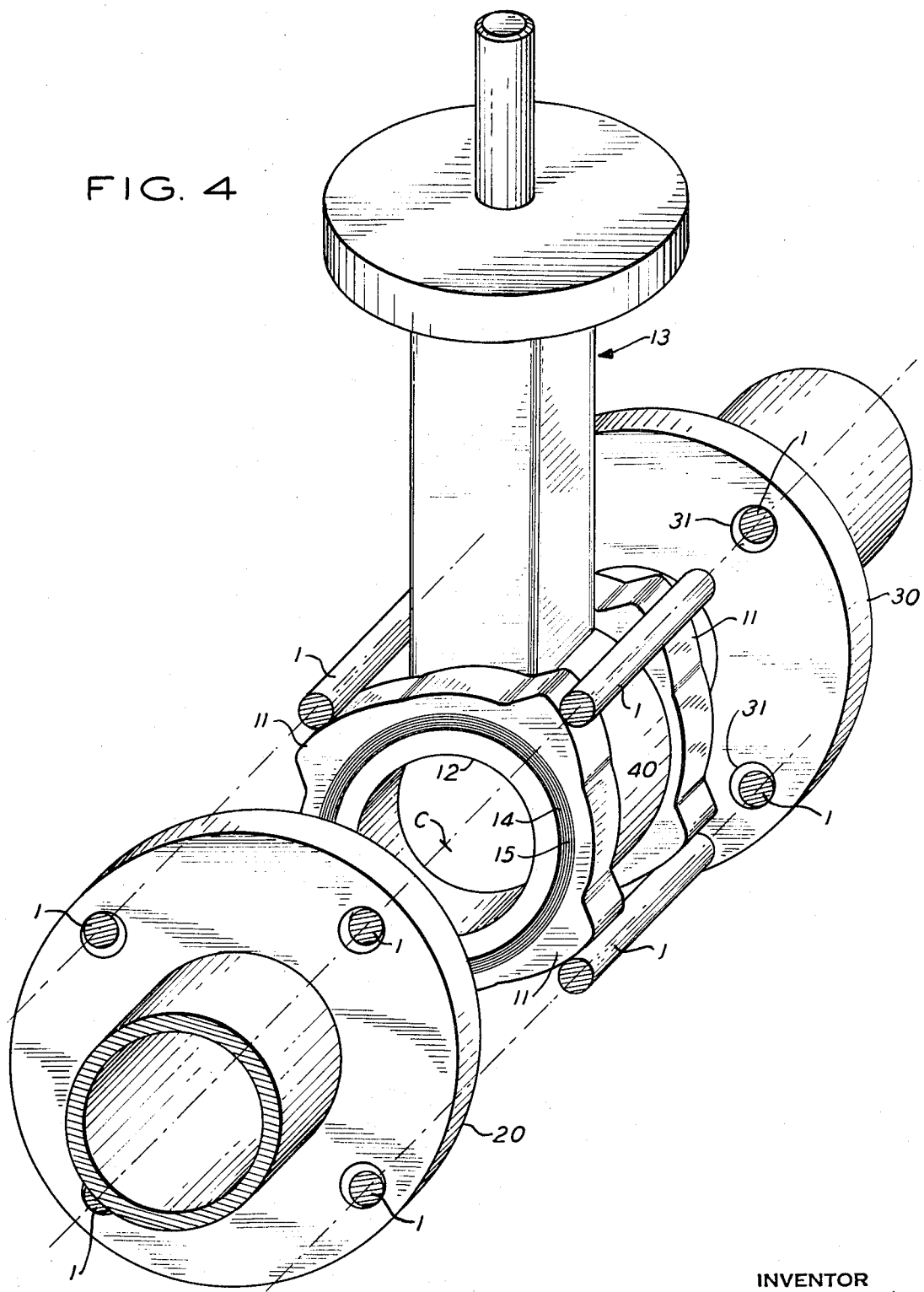
FIG. 4 shows an exploded perspective view of the invention applied to a flangeless valve.

FIG. 4 shows an application of the invention to a flangeless piping component, in this case a valve. The aligning cams 11 are cast integrally with the valve body 40. In this embodiment two spaced sets of cams are used because of the large distance between the flanges 20 and 30.

FIGS. 5 and 6 show respectively an elevational view and a side sectional view of an embodiment of the invention in which the camming surface is the outer circumference 16 of a circular alignment means 10 which forces the bolts 1 to the extreme radial of radius R, of the alignment means. In this embodiment an elastomeric gasket 15 is mechanically locked to but removable from the alignment means 10.

It will be apparent to those skilled in the art that the several embodiments of the invention described above shown in the drawings are merely illustrative and that others are possible within the scope of the invention.

I claim:

1. An improved valve structure having a valve bore and said improved structure for (i) axially aligning the valve bore with respect to opposed pipe flanges, and (ii) for also axially aligning the opposed pipe flanges with respect to each other, said improved valve structure being provided with axially spaced annular portions adjacent each end of said valve bore, each of said pipe flanges being provided with a plurality of radially disposed oversized bolt holes for receiving bolts for securing said valve structure and said pipe flanges together, such improved valve structure comprising:

a plurality of radially disposed camming surfaces provided on the outer periphery of each of said axially opposed annular portions, and upon said valve structure being positioned between said opposed pipe flanges and said bolts being received within said oversized bolt holes, said camming surfaces, upon rotation of said valve structure, for engaging said bolts and for forcing said bolts radially outwardly into the extreme outward radial positions permitted by said oversized bolt holes to (i) axially align said pipe flanges with respect to each other, and (ii) for axially aligning said valve bore with respect to said pipe flanges.

2. An improved valve structure according to claim 1 wherein said camming surfaces are provided with an initial slope which increases rapidly in height and then tends to level out.

3. An improved valve structure according to claim 2 wherein said valve structure annular portions are provided with transverse faces and said transverse faces are positioned opposite said pipe flanges, the further improvement comprising sealing means mounted in each transverse face for engaging and forming a seal with said opposed pipe flanges.

* * * * *